Figure 1A:
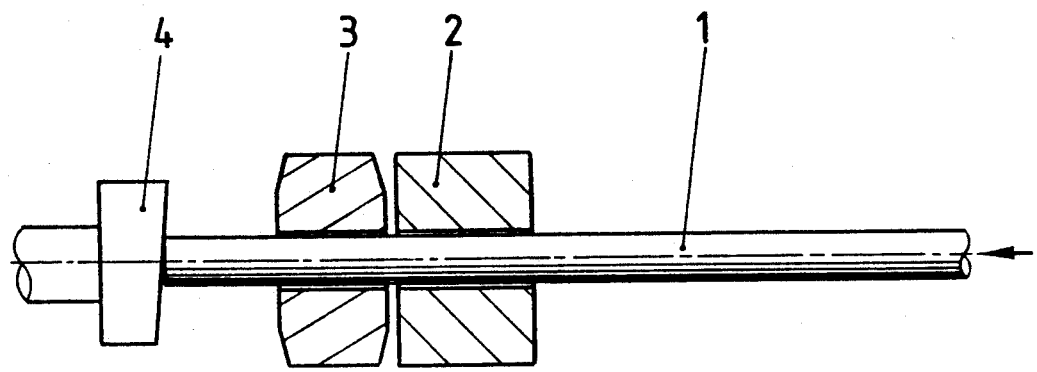

United States Patent [19]
Zanzerl et al.

[11] Patent Number: 5,156,073
[45] Date of Patent: Oct. 20, 1992

[54] METHOD AND DEVICE FOR DRAWING WIRE INTO A SHEARING STATION OF A FORMING PRESS

[75] Inventors: Hermann Zanzerl, Olsberg; Heinz Dettwiler, Lupsigen, both of Switzerland

[73] Assignee: Hatebur Umformmaschinen AG, Reinach, Switzerland

[21] Appl. No.: 588,147

[22] Filed: Sep. 26, 1990

[30] Foreign Application Priority Data

Sep. 27, 1989 [CH] Switzerland ............... 3506/89

[51] Int. Cl.$^5$ .............................................. B26D 1/04
[52] U.S. Cl. ............................................ 83/13; 83/196; 83/198; 83/268; 83/436
[58] Field of Search ............... 83/13, 35, 36, 37, 38, 83/23, 42, 54, 156, 198, 196, 268, 436, 467.1

[56] References Cited

U.S. PATENT DOCUMENTS

| | | | |
|---|---|---|---|
| 1,848,835 | 3/1932 | Peirce | 83/467.1 |
| 1,969,503 | 8/1934 | Ersergian | 83/268 |
| 3,114,282 | 12/1963 | Reifenhauser et al. | 83/37 |
| 3,800,645 | 4/1974 | Alcock et al. | 83/198 |
| 4,938,907 | 7/1990 | Vowles et al. | 83/36 |

FOREIGN PATENT DOCUMENTS

| | | |
|---|---|---|
| 0196466 | 8/1986 | European Pat. Off. |
| 275787 | 6/1912 | Fed. Rep. of Germany |
| 1074537 | 2/1960 | Fed. Rep. of Germany |
| 633704 | 12/1949 | United Kingdom |
| 973560 | 10/1964 | United Kingdom |
| 1024798 | 4/1966 | United Kingdom |

Primary Examiner—Douglas D. Watts
Assistant Examiner—Allan M. Schrock
Attorney, Agent, or Firm—Ralph W. Selitto, Jr.

[57] ABSTRACT

A method and apparatus achieve the intermittent feeding of raw material into a shearing station by exerting a drive torque on draw-in rollers in order to effect their rotation in one arcuate direction and hence the movement of the raw material toward the shearing station. A counteracting torque, which is less than the drive torque, is continuously exerted on the draw-in rollers. Thus, during intervals following a shearing operation when the drive torque is terminated, the counteracting torque functions to reverse the rotation of the draw-in rollers and hence retract the sheared end of the raw material away from the shearing station.

14 Claims, 6 Drawing Sheets

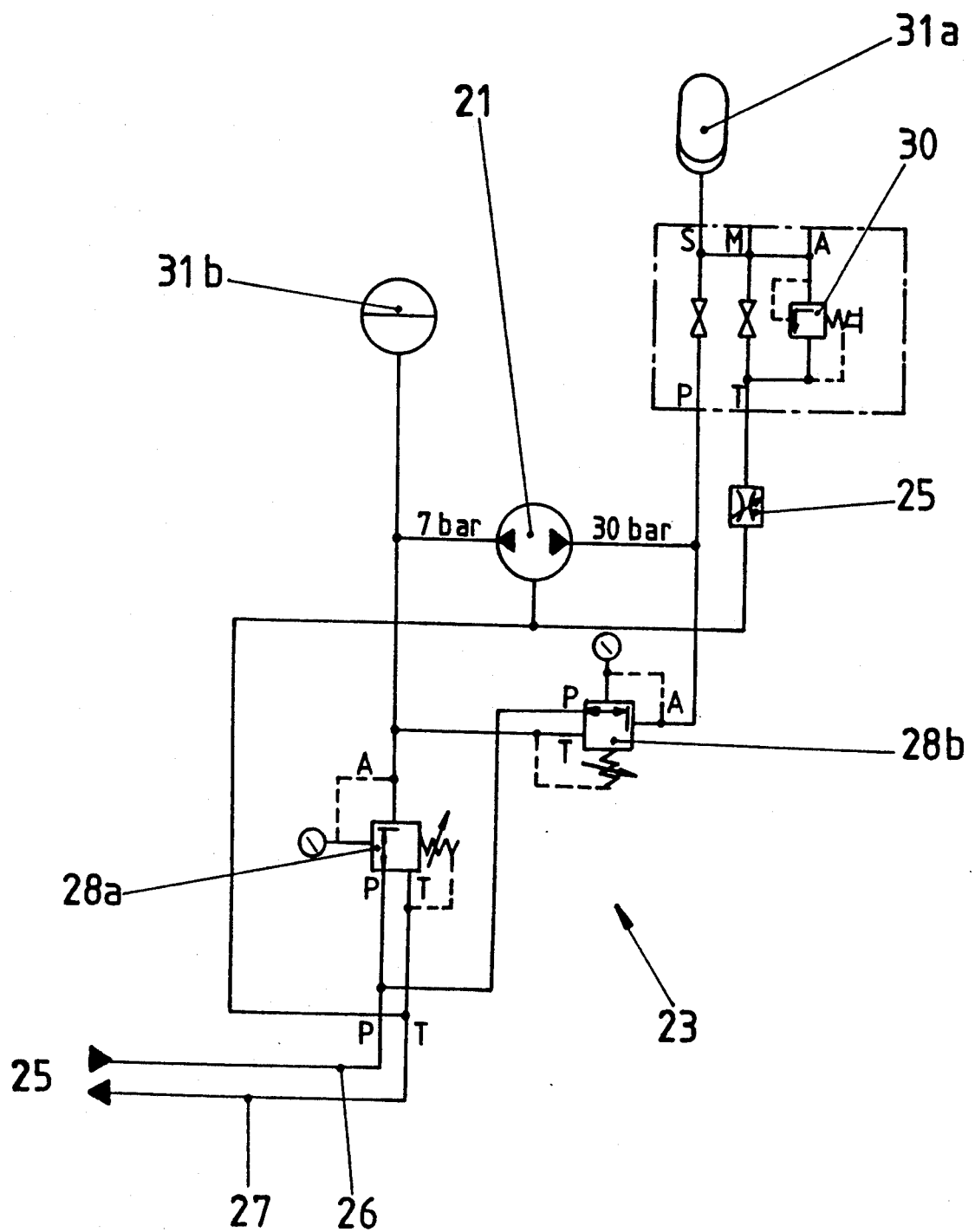

METHOD AND DEVICE FOR DRAWING WIRE INTO A SHEARING STATION OF A FORMING PRESS

In the shearing of raw material in wire form to produce wire sections of precise length, it is customary to draw in the raw material fed via draw-in rollers so that its end face rests against an adjustable stop. In production, the correct contacting of the stop by the end face of the raw material is generally monitored electrically. With such monitoring, it is, for example, ensured that, in the absence of contact of the raw material with the stop, the forming press is immediately stopped in order not to obtain sections cut off too short.

In order that reliable contacting of the stop can be guaranteed, the draw-in stroke is in practice always set somewhat too long, thus giving rise to a certain overstroke. As soon as the raw material drawn in contacts the stop with its end face, the draw-in rollers slip on the raw material due to the overstroke, with the result that said raw material is pressed firmly against the stop. Although this leads to a satisfactory dimensional accuracy of the section, it also leads simultaneously to a certain damage and/or bending due to the effect of the jarring impact against the stop. When the section cutter executes its return stroke after cutting off a section, the sheared face of the raw material, which before cutting off was still under a certain longitudinal compressive stress, can protrude to such an extent into the range of motion of the section cutter that the raw material scrapes along the latter and can thereby be damaged at the end face. During this process, a chip may for example be sheared off, seriously impairing the quality of the section, or so-called brow formation can occur.

The object of the invention is thus first of all to create a method for drawing raw material into a shearing station of a forming press, with which method the quality of the sections can be improved and, in particular, deformations of or damage to the sections of material does not occur. The object also relates to the creation of a functionally reliable device of as simple a construction as possible for carrying out this method.

It is furthermore known to the person skilled in the art that mechanical devices of this kind, which are based on the cooperation of a multiplicity of elements connected in series, cannot be constructed without "backlash". In the present context, this means that, after drawing in is complete, the draw-in mechanism briefly becomes unstable within the backlashes, the non-positive connection of the mechanism parts involved is briefly interrupted and at the beginning of the subsequent draw-in stroke is resumed jerkily with backlash compensation. Since the involved forces to be transmitted in each case amount to several tonnes, this results in a continuous stress on the device, which must have an effect particularly on the working life, but also, inter alia, on the operating noise of the machine.

A further aspect of the object on which the invention is based thus furthermore consists in eliminating the disadvantages associated with the backlashes mentioned and thereby to guarantee, in particular, gentle, jerk-free operation of the intermittently operating draw-in mechanism. The contact pressure of the drawing rollers on the raw material to be drawn in can be reduced since the draw-in rollers do not slip any more or any less than in conventional drive systems. Damage to the surface of the material is thereby avoided.

By means of the novel application of a torque continuously counteracting the draw-in roller drive, a counterdriving force is produced which serves as a braking force and, on the one hand, eliminates the excess energy of the accelerated raw material at the end of the draw-in stroke movement and, on the other hand, draws the raw material back somewhat after cutting off has been accomplished in order to allow the shearing or section cutter executing the return stroke to pass without coming into contact to any significant extent with the end face of the raw material.

This novel method on the one hand eliminates the necessity of complicated separate electronic control by means of sensors etc. On the other hand, the impact of the raw material against the stop is avoided since the pull-back force exerts a permanent braking effect. In addition, there is a further advantage that backlashes in the draw-in drive are eliminated since the superimposed countertorque eliminates the backlashes which occur, for example, at the tooth flanks; jerky starting at the beginning of the draw-in stroke is likewise eliminated thereby. The draw-in rollers do not slip and the roller contact pressure can be reduced somewhat. Damage to the surface of the raw material is avoided or at least reduced.

A conventional draw-in device with draw-in rollers which draw the raw material in intermittently in time with the rhythm of the metal forming machine is disclosed by British Patent 633,704. The intention is that stress caused by overstroke etc. during the forward motion should be reduced during the return motion of the draw-in drive. The draw-in mechanism can be separated manually from the crank drive of the machine using a type of locking coupling, so that the machine can continue to run even with the draw-in mechanism engaged. The draw-in mechanism likewise disengages itself automatically for a brief period, in each case at the end of the draw-in stroke.

The wire can move back somewhat, it is no longer clamped and the brief drawing in which leads to the known nibbling is thereby avoided. A foolproof mechanism prevents disengagement during the draw-in stroke.

In contrast, the present invention has no mechanical coupling device, subject to wear, for the drawing back of the wire but acts against the draw-in force with a hydraulic motor in such a way that the drawing back of the wire can begin smoothly or without a transition after the completion of the draw-in stroke. The drawing back of the wire in this device is thus controlled "steplessly". Hence the wire is not only relieved, but is moved back in a controlled manner, that is, held tightly between the draw-in rollers. Here, there is no drawing-back movement of the raw material left to chance when the draw-in drive is disengaged, and the drive mechanism of the draw-in device operates without backlash.

It is known from European Patent Application 0,196,466, which relates exclusively to hot presses, to perform a drawing back of the rod after shearing off has taken place. This is intended to compensate a lengthening of the rod, which as expected takes place due to a thermal longitudinal expansion. To perform the drawing-back movement, a draw-in roller drive motor independent of the main drive of the forming press is reversed after the ending of the draw-in stroke. Thus only a temporally linear reversal of the draw-in drive is achieved with these known measures but no superimposition on the driving torque nor an exertion of braking torque either, which, according to the invention, can take place simultaneously with and during the draw-in operation.

Furthermore, in the device according to the invention, the draw-in drive is coupled to the main drive of the cold forming machine via a mechanical crank mechanism. The driving power, derived from the main drive, for the draw-in drive is relatively small and is of little significance in the energy balance. In contrast, the additional draw-in drive required in European Patent Application 0,196,466 is relatively energy-intensive.

According to an advantageous development of the invention, the drawing-back movement of the raw material can be set to the total of the backlashes occurring in the draw-in roller drive. If a hydraulic motor is used as a drive element in the novel device, such setting can be implemented in a particularly simple manner by pressure changes in the hydraulic system. The use of a hydraulic drive also has considerable advantages over known draw-in mechanisms, which operate, for example, with friction brakes. Heat dissipation problems, for example, can be solved without difficulty by external coolers. In a hydraulic drive, there are also no brake force changes due to wear, as with brake linings, thus making it possible to guarantee a high operational reliability overall with this type of drive.

In addition, the monitoring of a hydraulic drive is unproblematic. Both the counteracting torque and the drawing-back movements can be adjusted and monitored simply, for example electrically or electronically, via the monitoring of the hydraulic pressure processes. If a technical malfunction should occur, this could be detected by a pressure switch and correspondingly signaled or a shutdown of the operation of the press carried out.

Figure 1B:
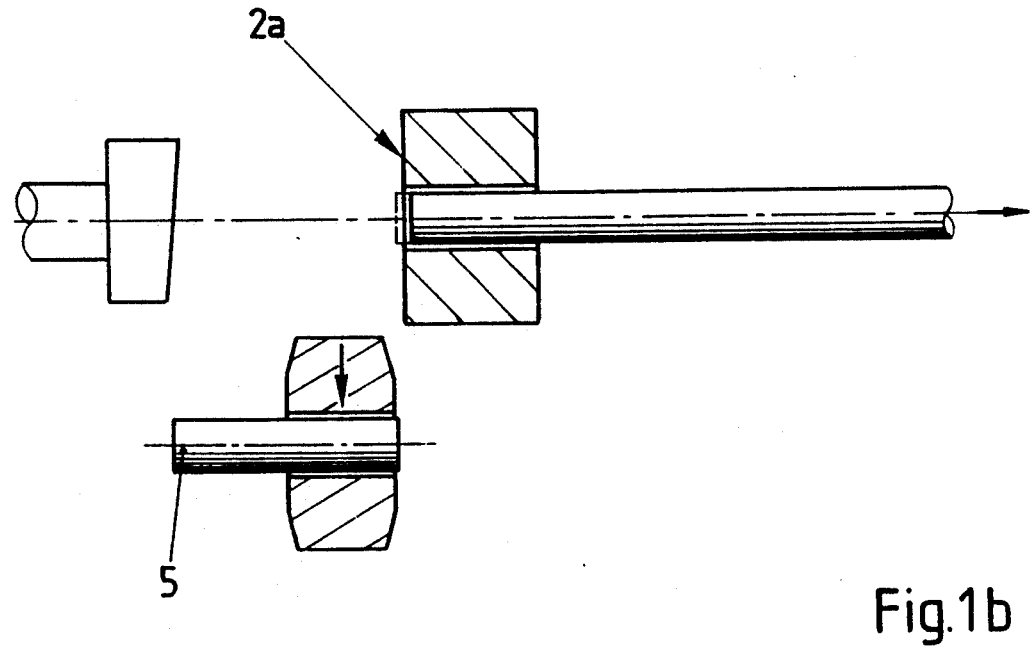
Figure 2A:
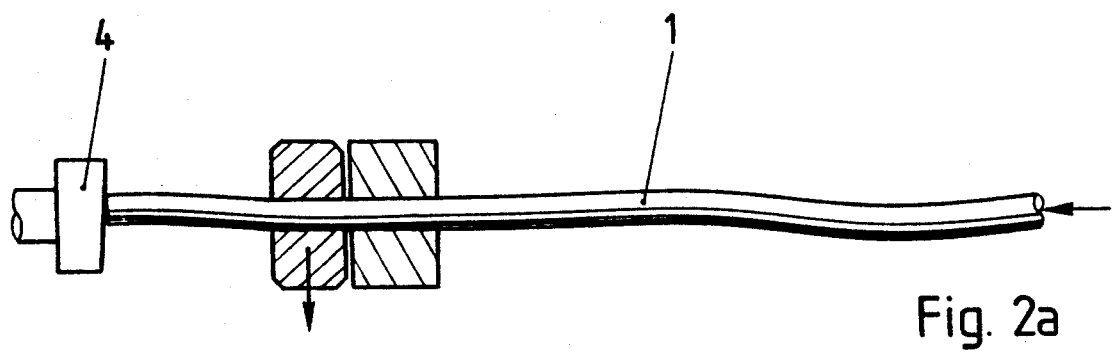
Figure 2B:
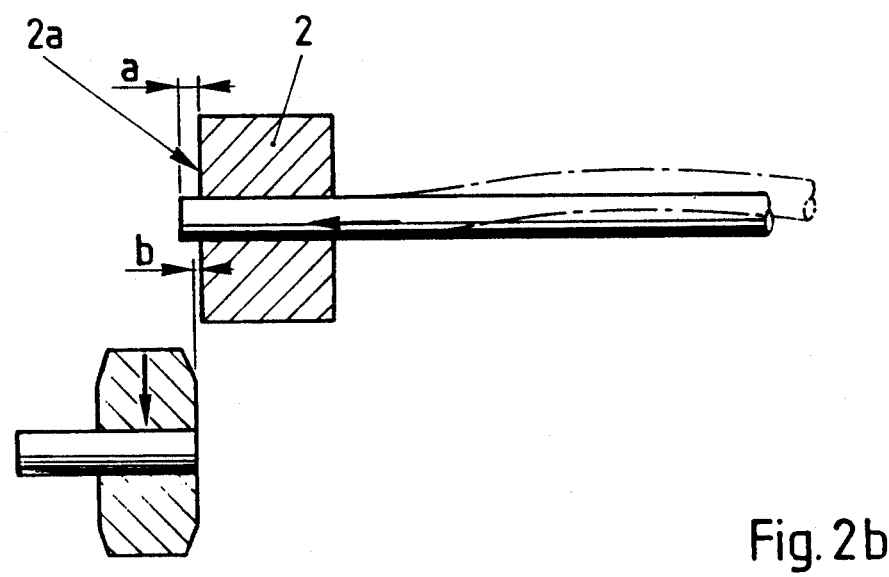
Figure 2C:
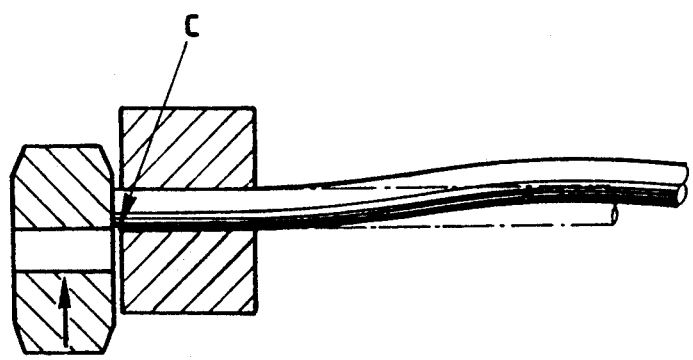
Figure 3:
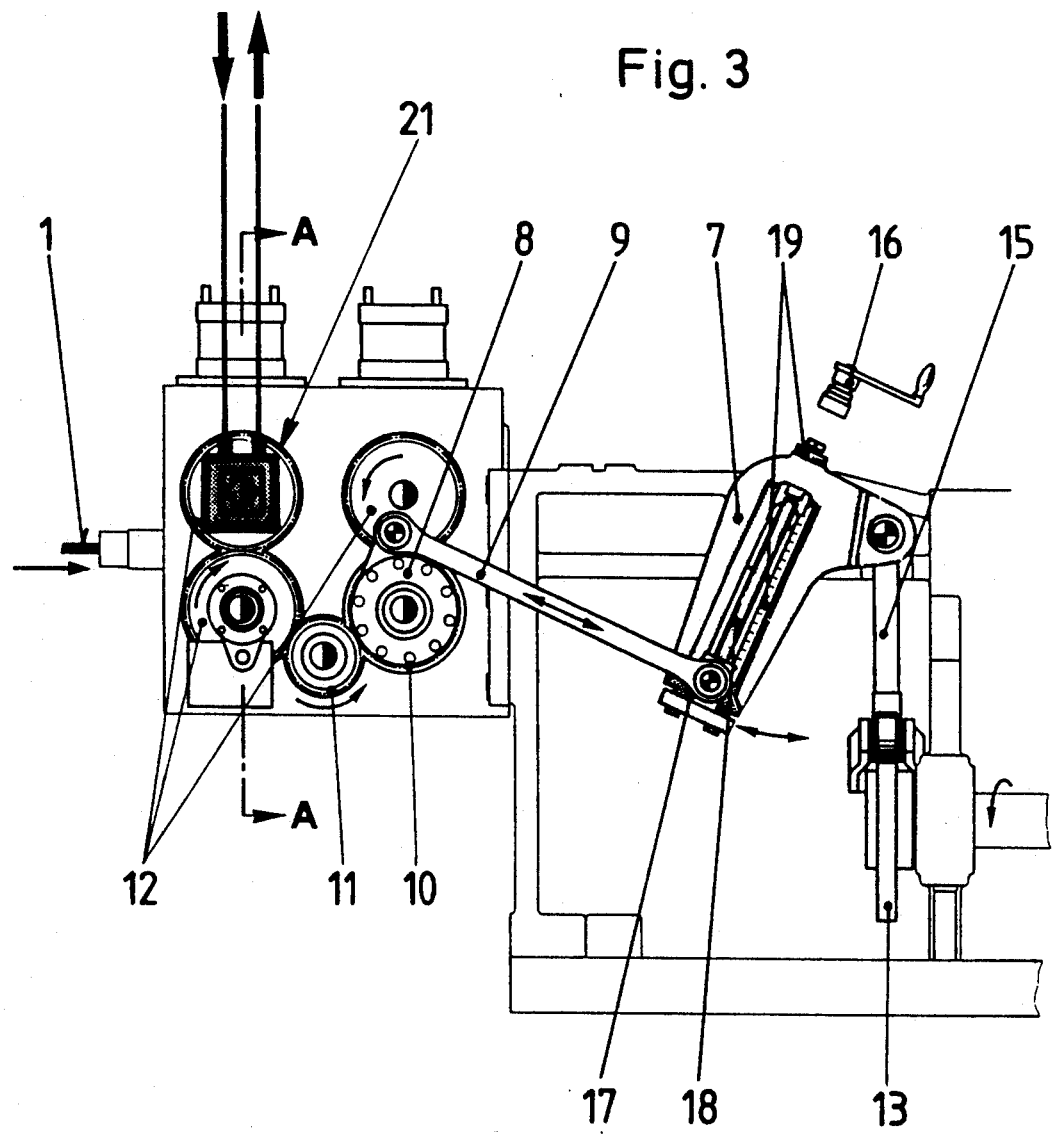
Figure 4A:
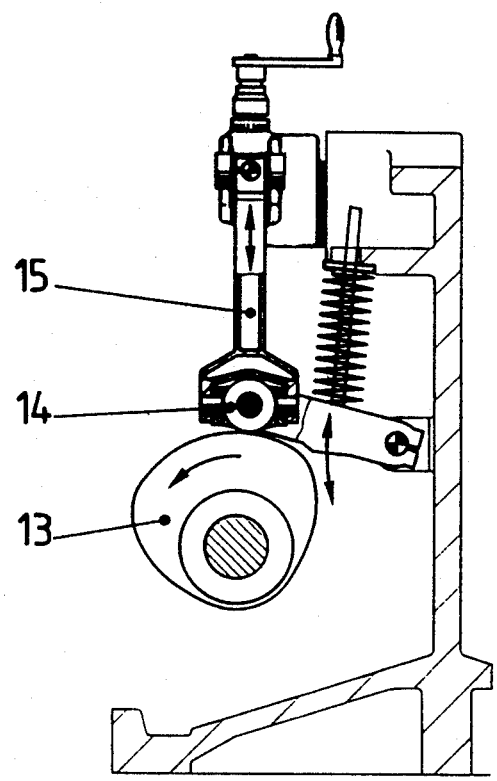
Figure 4B:
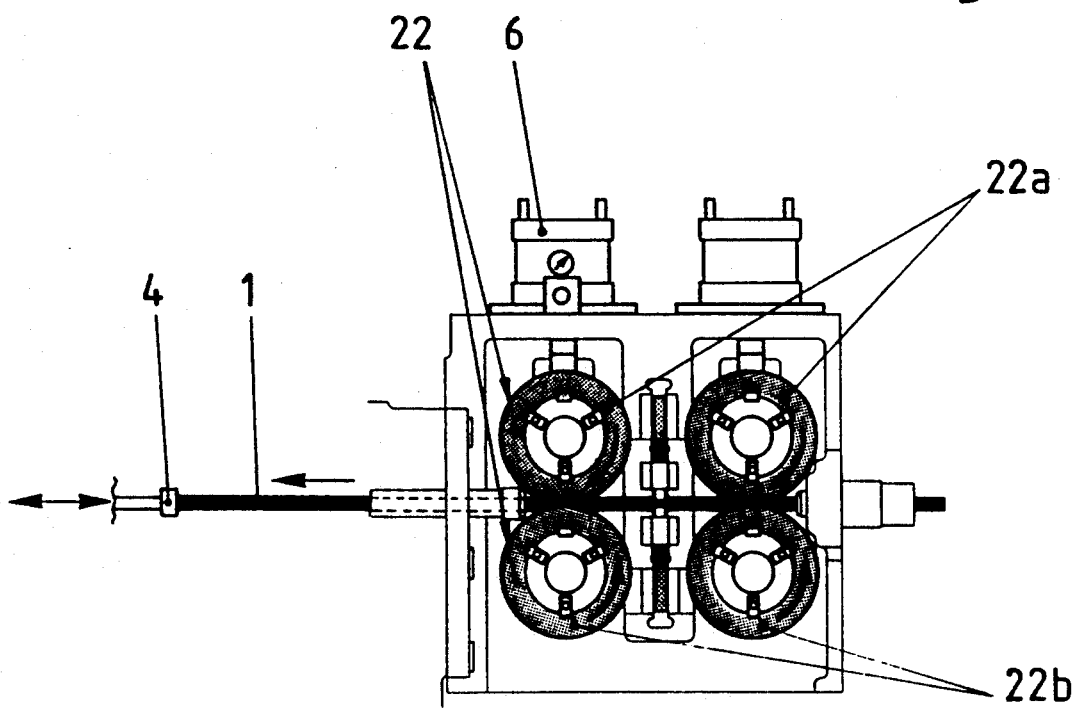
Figure 5:
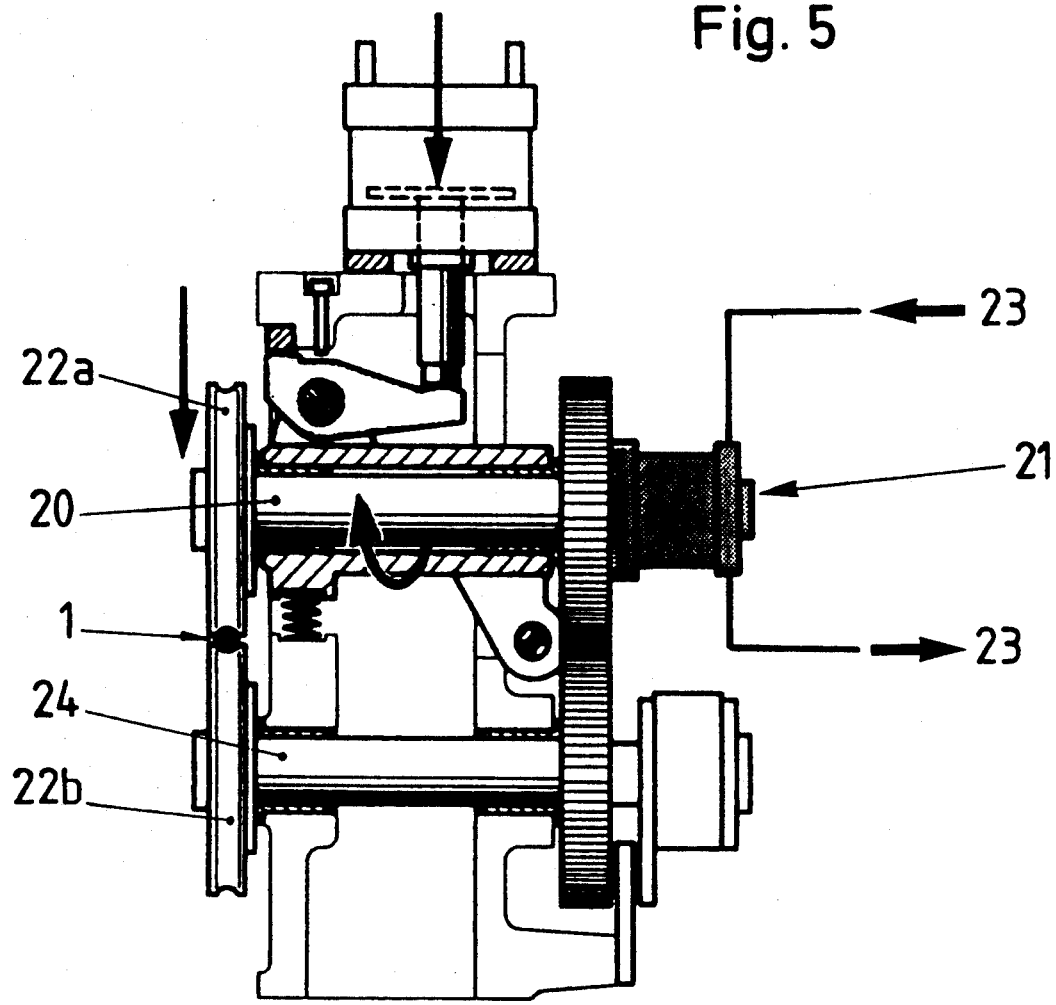

Further features and advantages of the invention emerge from the following description of a preferred illustrative embodiment with reference to drawings, in which:

FIG. 1a shows a schematic plan view of a shearing station before the beginning of shearing, FIG. 1b shows the same shearing station after a section has been sheared off, FIG. 2a shows a schematic sectional representation in plan view which shows the bending of the raw material (1) drawn-in with an overstroke, upstream and downstream of the shearing cutter, FIG. 2b shows schematic sectional representations of the protrusion of the raw material (1) after the section has been sheared off by the cutter and transported to the ejector stage (direction of arrow), FIG. 2c shows a schematic sectional representation of the collision between the returning (direction of arrow) empty section cutter and the protruding raw material, FIG. 3 shows a schematic side view of a mechanical drive for drawing in the material upstream of the shearing station shown in FIG. 1a, FIG. 4a shows a schematic sectional representation of a cam mechanism for the draw-in drive shown in FIG. 3, FIG. 4b shows a schematic side view of a material draw-in device with four draw-in rollers clamped onto the material, FIG. 5 shows a schematic sectional representation of a part of the material draw-in device with the section taken along the line A—A on FIG. 3, FIG. 6 shows a schematic representation of the setting and control arrangement associated with the drive element 21.

In the shearing station in FIG. 1a, the material 1 is drawn in the direction of the arrow, pushed forward by two successive pairs of draw-in rollers 22 (FIG. 4b) and thrust against a stop 4. The material is predominantly thin wire, as customarily used for cold forming. In order to be able to introduce and grip the wire material between the draw-in rollers 22, the upper draw-in rollers 22a in FIG. 4b are raised via pneumatic cylinders 6, lowered and, in the process, pressed against the wire 1. Downstream of the draw-in rollers 22 in the draw-in direction, the wire 1 is first of all drawn in through a closed wire cutter 2 and then through a likewise closed shearing cutter 3, as far as the stop 4. To initiate the shearing process, the shearing cutter 3 is for example displaced transversely to the draw-in direction in the direction of the arrow and in the process cuts off from the wire 1 a wire section 5 illustrated at the bottom in FIG. 1b.

It can be seen from FIG. 3 that each draw-in roller 22 in FIG. 4b is driven individually. The rotation of the draw-in rollers 22, which takes place only jerkily and in one direction, is produced by the oscillating motion of a draw-in stroke adjusting lever 7 in conjunction with a freewheel 8, which is coupled to the adjusting lever 7 by a draw-in transmission rod 9. Connected to the freewheel 10 is a gear mechanism 11, 12 of the draw-in roller drive. As can be seen from FIG. 5, the gears are connected to the draw-in rollers 22a and 22b respectively via draw-in roller shafts 20, 24.

The draw-in stroke adjusting lever 7, for its part, is connected to a main drive shaft 13a for the forming press by a transmission rod 15 (see FIG. 4a), which rolls against a draw-in control cam 13 by means of a cam roller 14. The draw-in stroke can be adjusted by rotation of an adjusting spindle 18 by means of a hand crank 16, attached to the draw-in stroke adjusting lever 7, or a corresponding motor drive, which adjusting spindle moves a sliding member 17 within a guide in the adjusting lever 7, the stroke of the draw-in transmission rod thereby being shortened or lengthened. Scales 19 provided on the adjusting lever 7 and/or on the adjusting spindle 18 allow the stroke length to be read off. Instead of the scales, it is also possible for electric position indicators to be provided.

Connected to the upper draw-in roller shaft 20 in FIG. 5 of the front draw-in roller pair in the feed direction of the wire 1 is a schematically represented drive element, which is illustrated in the exemplary embodiment shown as a hydraulic motor 21. This hydraulic motor exerts on the draw-in roller shaft 20 and hence on the entire draw-in gear mechanism 10, 11, 12 a torque directed counter to the driving torque. The direction of rotation of the said upper draw-in rollers 22a in FIG. 4b, as indicated by the rotation arrow, is clockwise and the hydraulic motor 21 drives the said draw-in roller shaft 20 in the counterclockwise direction, as shown in FIG. 5. A setting and control arrangement 23 (see FIG. 6) of the hydraulic motor 21 serves for setting and maintaining this counteracting torque, which amounts to less than 50% of the draw-in roller driving torque.

If the wire 1 is now to be thrust with its sheared-off end face against the stop 4 in the manner shown in FIG. 1a, then, depending on the countertorque setting selected via the setting and control arrangement 23, which countertorque could also be referred to as braking torque, the hydraulic motor 21 brings about an essentially rebound-free impact of the material against the stop 4. Bending of the wire material (see FIG. 2a)

upstream and downstream of the shearing tools 2, 3 is thereby avoided, as is any ridge formation or compression of the wire material end face against the stop surface (see FIG. 2c).

The countertorque preset by the hydraulic motor 21 furthermore has the effect that, in the stoppage intervals of the draw-in roller drive, i.e. after the cutting off of the wire section 5, a drawing back of the wire 1, marked in FIG. 1b, takes place, specifically until its end face is behind the cutting edge 2a of the wire cutter. After the wire section 5 has been ejected, the shearing cutter 3 can as a result return into its shearing position without the wire scraping along its cutting face. The end face at "c" (FIG. 2c) of the wire material is therefore always retained unaltered after cutting off has taken place, and the shearing cutter face is also exposed to no risk of damage nor even merely to increased wear. In addition, due to the soft impact of the wire end face, the contact surface of the stop 4 and its adjusting device are spared in a manner which reduces wear.

The setting and control arrangement 23 indicated schematically in FIG. 6 comprises corresponding hydraulic lines 25, pressure control devices (not shown) and also correspondingly electrically driven setting-/control elements. In this figure, 26 denotes the hydraulic or pneumatic supply line,
27 denotes the return line
P=pressure,
T=tank,
28a/28b denote pressure setting elements with manometer for varying the countertorque,
29 denotes a restrictor,
30 denotes a pressure relief element, and
31a/31b denote hydraulic accumulators as pressure compensating elements.

Via the hydraulic lines, the pressure medium can be cooled easily outside the draw-in area of the press, so that the production of the counteracting torque is practically without wear. Easy function monitoring of the hydraulic motor via the setting and control arrangement 23 can be performed by pressure switches or similar known elements.

The coupling, shown in FIG. 3, of the draw-in drive to the main drive of the forming press via the mechanical cam mechanism represents a type of drive with high driving reliability and an extremely favorable energy balance.

By virtue of the described structural design of the draw-in mechanism, the surprisingly uncomplicated solution of the other aspect of the object specified at the outset is now also obtained: the backlashes necessarily present in the mechanical system of the device are continuously eliminated by the additional torque superimposed on the driving torque, any instability of the drive caused by backlash formation thereby being avoided and gentle, jerk-free and low-noise operation being guaranteed, and the four draw-in rollers starting simultaneously to one another, this giving optimum efficiency for the draw-in force, thereby making it possible to reduce the contact pressure of the rollers, this in turn reducing the total compression distance of the raw material length between draw-in roller and stop.

The invention described thus permits by uncomplicated means the simultaneous starting of all the draw-in rollers, the soft landing of the raw material on the stop and the drawing back of the material in the draw-in interval.

Although the word "wire" has been used in the description of the example, this term is intended to encompass not only the material which can be withdrawn from a reel but also the rod material usually processed on hot presses.

We claim:

1. A method for intermittently feeding raw material, in rod or wire form, into a shearing station of a cold forming press where the raw material is divided into sections of predetermined length, comprising the steps of directly coupling a draw-in drive of draw-in rollers to a main drive shaft of the cold forming press; exerting a first torque on said draw-in rollers in such a manner that said draw-in rollers are rotated in a first arcuate direction selected so as to move the raw material in a first linear direction through a shearing aperture of a shearing cutter and against a stop, which locates the raw material in preparation for a shearing operation by said shearing cutter; terminating said first torque, and hence the rotation of said draw-in rollers in said first arcuate direction, at predetermined intervals coinciding with the performance of a shearing operation, which is commenced after the raw material contacts said stop; and continuously exerting a second torque on said draw-in rollers in such a manner that said second torque counteracts said first torque, said second torque being less than said first torque, whereby the raw material is moved in said first linear direction, as long as said first torque is being exerted on said draw-in rollers, but great enough to rotate said draw-in rollers in a second arcuate direction, opposite to said first arcuate direction, when said first torque is not being exerted on said draw-in rollers, whereby the raw material is moved in a second linear direction, opposite to said first linear direction, after the performance of a shearing operation to thereby retract a sheared end of the raw material out of the path of said shearing cutter as said shearing cutter returns to a home position for the performance of the next shearing operation.

2. The method according to claim 1, wherein said second torque is variable.

3. The method according to claim 1 or 2, wherein said second torque is preset to a constant value selected depending upon the material being fed.

4. The method according to claim 1 or 2, wherein said second torque is preset at a value selected to eliminate backlash from said draw-in rollers.

5. The method according to claim 1 or 2, wherein said second torque is preset at a value selected to brake the impact of the raw material against said stop.

6. The method according to claim 1 or 2, wherein said second torque is less than fifty percent of said first torque.

7. The method according to claim 1 or 2, wherein said second torque is generated by a hydraulic motor coupled to a shaft of at least one of said drive-in rollers.

8. The method according to claim 1, further comprising the step of terminating said first torque, and hence the rotation of said draw-in rollers in said first arcuate direction, at predetermined intervals coinciding with the performance of a shearing operation, which is commenced after the raw material contacts said stop.

9. Apparatus for intermittently feeding raw material, in rod or wire form, into a shearing station of a cold forming press where the raw material is divided into sections of predetermined length, comprising draw-in rollers having a draw-in drive which is directly coupled to a main drive shaft of the cold forming press; first exerting means for exerting a first torque on said draw-in rollers in such a manner that said draw-in rollers are rotated in a first arcuate direction selected so as to move the raw material in a first linear direction through a shearing aperture of a shearing cutter and against a stop, which locates the raw material in preparation for a shearing operation by said shearing cutter; terminating said first torque, and hence the rotation of said draw-in rollers in said first arcuate direction, at predetermined intervals coinciding with the performance of a shearing operation, which is commenced after the raw material contacts said stop; and second exerting means for continuously exerting a second torque on said draw-in rollers in such a manner that said second torque counteracts said first torque, said second torque being less than said first torque, whereby the raw material is moved in said first linear direction as long as said first torque is being exerted on said draw-in rollers, but great enough to rotate said draw-in rollers in a second arcuate direction, opposite to said first arcuate direction, when said first torque is not being exerted on said draw-in rollers, whereby the raw material is moved in a second linear direction, opposite to said first linear direction, after the performance of a shearing operation to thereby retract a sheared end of the raw material out of the path of said shearing cutter as said shearing cutter returns to a home position for the performance of the next shearing operation.

10. Apparatus according to claim 9, further comprising controlling means for adjustably controlling said second torque.

11. Apparatus according to claim 10, wherein said second exerting means includes a hydraulic motor coupled to a shaft of at least one of said draw-in rollers.

12. Apparatus according to claim 11, wherein said hydraulic motor forms a part of a hydraulic system which includes said controlling means.

13. Apparatus according to claim 10, 11 or 12, wherein said controlling means includes monitoring means for monitoring said second torque.

14. The apparatus according to claim 9, further comprising terminating means for terminating said first torque, and hence the rotation of said draw-in rollers in said first arcuate direction, at predetermined intervals coinciding with the performance of a shearing operation, which is commenced after the raw material contacts said stop.

* * * * *